(12) United States Patent
Sugisaki

(10) Patent No.: US 7,126,965 B2
(45) Date of Patent: Oct. 24, 2006

(54) SYSTEM FOR ADAPTIVE RESENDING REQUEST CONTROL IN MOBILE RADIO COMMUNICATIONS

(75) Inventor: Atsushi Sugisaki, Tokyo (JP)

(73) Assignee: NEC Corporation, Tokyo (JP)

( * ) Notice: Subject to any disclaimer, the term of this patent is extended or adjusted under 35 U.S.C. 154(b) by 975 days.

(21) Appl. No.: 10/092,553

(22) Filed: Mar. 8, 2002

(65) Prior Publication Data

US 2002/0131449 A1    Sep. 19, 2002

(30) Foreign Application Priority Data

Mar. 13, 2001    (JP)    ............................. 2001-069595

(51) Int. Cl.
H04J 3/22    (2006.01)

(52) U.S. Cl. .................................... 370/468

(58) Field of Classification Search ................ None
See application file for complete search history.

(56) References Cited

U.S. PATENT DOCUMENTS

| | | | | |
|---|---|---|---|---|
| 6,167,031 | A * | 12/2000 | Olofsson et al. | 370/252 |
| 6,768,727 | B1 * | 7/2004 | Sourour et al. | 370/335 |
| 2001/0037485 | A1 * | 11/2001 | Zhang | 714/790 |
| 2001/0056560 | A1 * | 12/2001 | Khan et al. | 714/746 |
| 2003/0128674 | A1 * | 7/2003 | Kong et al. | 370/320 |
| 2003/0131302 | A1 * | 7/2003 | Nobelen | 714/752 |

FOREIGN PATENT DOCUMENTS

| | | |
|---|---|---|
| EP | 0 768 806 A2 | 4/1997 |
| JP | 64-42944 | 2/1989 |
| JP | 01042944 | 2/1989 |
| JP | 3-233655 | 10/1991 |
| JP | 5-68154 | 3/1993 |
| JP | 7-67175 | 3/1995 |
| JP | 7-336331 | 12/1995 |
| JP | A 8-51414 | 2/1996 |
| JP | A 11-289358 | 10/1999 |
| JP | A 2000-299712 | 10/2000 |
| WO | 99/12304 | 3/1999 |
| WO | 99/63702 | 12/1999 |

OTHER PUBLICATIONS

S. Bakhtiyan et al., "Practical Implementation of a Mobile Data Link Protocol With a Type II Hybrid ARQ Scheme and Code Combining," *43rd IEEE Vehicular Technology Conference*, Personal Communication—Freedom Through Wireless Technology, 1993, pp. 774-777.

Ill-Woo Lee, "A Study on the Performance Analysis of Error Control Algorithms in Digital Cellular DS/CDMA Systems," Communications, 1994; ICC '94, Supercomm/ICC '94, Conference Record, 'Serving Humanity Through Communications,' IEEE International Conference on New Orleans, LA, USA May 1-5, 1994, New York, NY, IEEE, pp. 908-912.

* cited by examiner

*Primary Examiner*—Chi Pham
*Assistant Examiner*—Anh-Vu Ly
(74) *Attorney, Agent, or Firm*—Young & Thompson

(57) ABSTRACT

In adaptive resending request control method and system in mobile radio communications, a reception side measures a line state in a line of a radio section, and selects, in accordance with the measurement result, the optimum packet resending control period from an association table of measurement values and packet resending control periods stored in advance to renew the control state and make the resending control period variable so that an excellent delay characteristic can be achieved. In accordance with the line state of the radio section, the highest precision line state measuring method can be selected.

15 Claims, 12 Drawing Sheets

DATA TRANSMISSION SIDE

FIG.7

ASSOCIATION TABLE STORED IN
DATA STORAGE PORTION 2

| SIR | CODING RATE | STATE |
|---|---|---|
| 8dB<SIR | 7/8 | S11 |
| 7dB≦SIR<8dB | 3/4 | S12 |
| SIR<7dB | 1/2 | S13 |

8-VALUE SOFT DECISION
VITERBI DECODING

FIG.8

ASSOCIATION TABLE STORED IN
DATA STORAGE PORTION 6

| CODING RATE | STATE |
|---|---|
| 7/8 | S11 |
| 3/4 | S12 |
| 1/2 | S13 |

STATE TRANSITION DIAGRAM

FIG.13

ASSOCIATION TABLE STORED IN
DATA RECORDING PORTION 12

| SIR | PACKET ARRIVAL RATE | PACKET RESENDING CONTROL PERIOD | STATE |
|---|---|---|---|
| 10dB<SIR | $p \leq 9 \times 10^{-1}$ | 10msec | S21 |
| 5dB≤SIR<10dB | $7 \times 10^{-1} \leq p < 9 \times 10^{-1}$ | 7msec | S22 |
| SIR<5dB | $p < 7 \times 10^{-1}$ | 5msec | S23 |

FIG.14

ASSOCIATION TABLE STORED IN
DATA STORAGE PORTION 16

| PACKET RESENDING PERIOD | STATE |
|---|---|
| 10msec | S21 |
| 7msec | S22 |
| 5msec | S23 |

STATE TRANSITION DIAGRAM

SYSTEM FOR ADAPTIVE RESENDING REQUEST CONTROL IN MOBILE RADIO COMMUNICATIONS

BACKGROUND OF THE INVENTION

1. Field of the Invention

The present invention relates to an adaptive resending request control system in mobile radio communications for controlling the data transmission speed in mobile radio communications in accordance with the state of a communication line to achieve the optimum transmission speed and delay characteristic that satisfy the required quality.

2. Description of the Prior Art

In conventional mobile radio communications, an error correction coding system for carrying out self-correction (hereinafter referred to as "FEC" (forward error correction)) and an automatic repeat request system for resending data from a transmission side when a data transmission error occurs at a reception side (hereinafter referred to as "ARQ" (automatic repeat request)) are known as a method of implementing error free data transmission. Further, a hybrid ARQ system comprising the combination of FEC and ARQ is also known.

For example, Japanese Laid-open Patent Publication No. Hei-7-67175has proposed, as a prior art, a system of controlling the transmission speed stepwise in accordance with the line state (the line condition). FIG. 1 is a flowchart showing the control operation in this system.

Data transmission is started in control step 32, and it is judged in control step 33 whether the transmission speed is equal to the highest speed (9600 bps) or not. If the judgment in the control step 33 is "YES", then it is judged in control step S34 whether there is any resending request or not. If there is a resending request, the resending processing is carried out in control step 35 and the resending frequency (the number of times of the resending) is counted. If it is judged in control step 36 that the resending frequency is equal to N or more, the transmission speed is decremented by one level in control step 37 and set to 4800 bps. Subsequently, resending frequency CNT is cleared in control step 38, storage memory is accessed in control step 39 and mode setting is carried out in control step 40. It is judged in control step 41 whether the transmission is finished or not.

If the judgment in the control step 33 is "No", it is judged in a control step 42 whether correction is impossible. If the judgment in the control step 42 is "Yes", it is judged in control step 44 whether the transmission speed is equal to 4800 bps which is lower than 9600 bps by one level. If the judgement in the control step 44 is "Yes", a resending request is made in control step 45. On the other hand, if the judgment in the control step 44 is "No", it is judged whether the transmission is finished or not as in the case of the control step 41. If the judgment in the control step 42 is "No", the correction processing is carried out as in the case of the control step 43.

In this system, when a burst error occurs, control steps of several stages are needed until the transmission speed reaches the optimum one because the transmission speed is stepwise controlled. Accordingly, this system has a disadvantage that the control thereof cannot sufficiently follow occurrence of a burst error. Further, the conventional technique has the following disadvantage. That is, since the resending control period is fixed, the delay time of the data resending cannot be controlled and thus the optimum delay characteristic cannot be achieved in accordance with the line state. Further, there is no variation in the measuring method of the line state, and thus high-precision measurement cannot performed on some line states.

Furthermore, Japanese Laid-open Patent Publication No. Sho-64-42944 discloses a device for detecting a bit error rate by line quality detecting means and varying the coding rate in accordance with the detection result in a packet communication device having an error correcting function. According to this technical concept, the coding rate or the type of the coding is varied in accordance with the line quality, and if the line quality is excellent, the information amount is increased to achieve an effective use of the line. According to this system, the information speed is variable, however, the transmission speed is fixed.

Still furthermore, Japanese Laid-open Patent Publication No. Hei-7-336331 discloses a digital radio communication system having means of grasping the line state on the basis of the resending frequency or the bit error rate measured and changing the coding rate of the error correction coding in accordance with the line state. Further, with respect to a code division multiple access system (CDMA system), it also discloses a system for varying the coding rate in accordance with a traffic amount and a system of measuring the line bit error rate and varying the coding rate in accordance with the measurement result. As a result, it concludes that these systems can vary the coding rate to the optimum state in accordance with the line state and achieve the optimum throughput in the line state. In this case, there is a disadvantage that it takes a long time to grasp the line state on the basis of the resending frequency, and data of a predetermined pattern must be transmitted before packet transmission in order to measure the bit error rate.

SUMMARY OF THE INVENTION

Therefore, an object of the present invention is to provide an adaptive resending request control system (in mobile radio communications) that has a function of controlling the data transmission speed more flexibly to thereby achieve the optimum transmission speed satisfying required quality even when a burst error occurs, making variable a window size for controlling data resending, that is, a resending control period to thereby control the delay characteristic of the data resending and achieve the optimum delay characteristic corresponding to a line state, and selecting a line state measuring method having the highest precision in accordance with the line state of a radio section, whereby a high-precision line state measurement is performed.

In order to attain the above object, according to a first aspect of the present invention, there is provided a system for an adaptive resending request control in mobile radio communications, comprising:

(a) measuring means for measuring a line state of a line of a radio section, first selecting means for selecting a control state of a coding rate in correspondence with the measurement results on the basis of the measurement results, and means for renewing the control state and transmitting the control data on the control state to a transmission side, in a reception side; and (b) second selecting means for selecting the coding rate in correspondence with the received control data on the basis of the received control data, and means for generating data with the selected coding rate and transmitting the generated data to the reception side, in a transmission side.

Further, in order to attain the above object, according to a second aspect of the present invention, there is provided a system for an adaptive resending request control in mobile radio communications, comprising:

(a) measuring means for measuring a line state of a line of a radio section, first selecting means for selecting a control state of a packet resending control period in correspondence with the measurement results on the basis of the measurement results, and means for renewing the control state and transmitting the control data on the control state to a transmission side, in a reception side; and (b) second selecting means for selecting the packet resending control period in correspondence with the received control data on the basis of the received control data, and control means for controlling a packet resending control period to the selected packet resending control period, in a transmission side.

Further, in order to attain the above object, according to a third aspect of the present invention, there is provided a system for an adaptive resending request control in mobile radio communications, comprising:

(a) measuring means for measuring a line state of a line of a radio section, first selecting means for selecting a control state of a coding rate and packet resending control period in correspondence with the measurement results on the basis of the measurement results, and means for renewing the control state and transmitting the control data on the control state to a transmission side, in a reception side; and (b) second selecting means for selecting the coding rate and packet resending control period in correspondence with the received control data on the basis of the received control data, means for generating data with the selected coding rate and transmitting the generated data to the reception side, and control means for controlling a packet resending control period to the selected packet resending control period, in a transmission side.

BRIEF DESCRIPTION OF THE DRAWINGS

FIG. 7 shows an example of an association table to be stored in data storage portion 2 in FIG. 2;

FIG. 8 shows an example of an association table to be stored in data storage portion 6 in FIG. 2;

FIG. 13 shows an example of an association table stored in data storage portion 12 of FIG. 3;

FIG. 14 shows an example of an association table stored in data storage portion 16 of FIG. 3.

DETAILED DESCRIPTION OF THE PREFERRED EMBODIMENTS

Preferred embodiments of an adaptive resending request control system in mobile communications according to the present invention will be described with reference to the accompanying drawings.

First, a system construction suitable to implement each system of the present invention will be described hereunder with reference to FIGS. 2 to 4.

Figure 1:
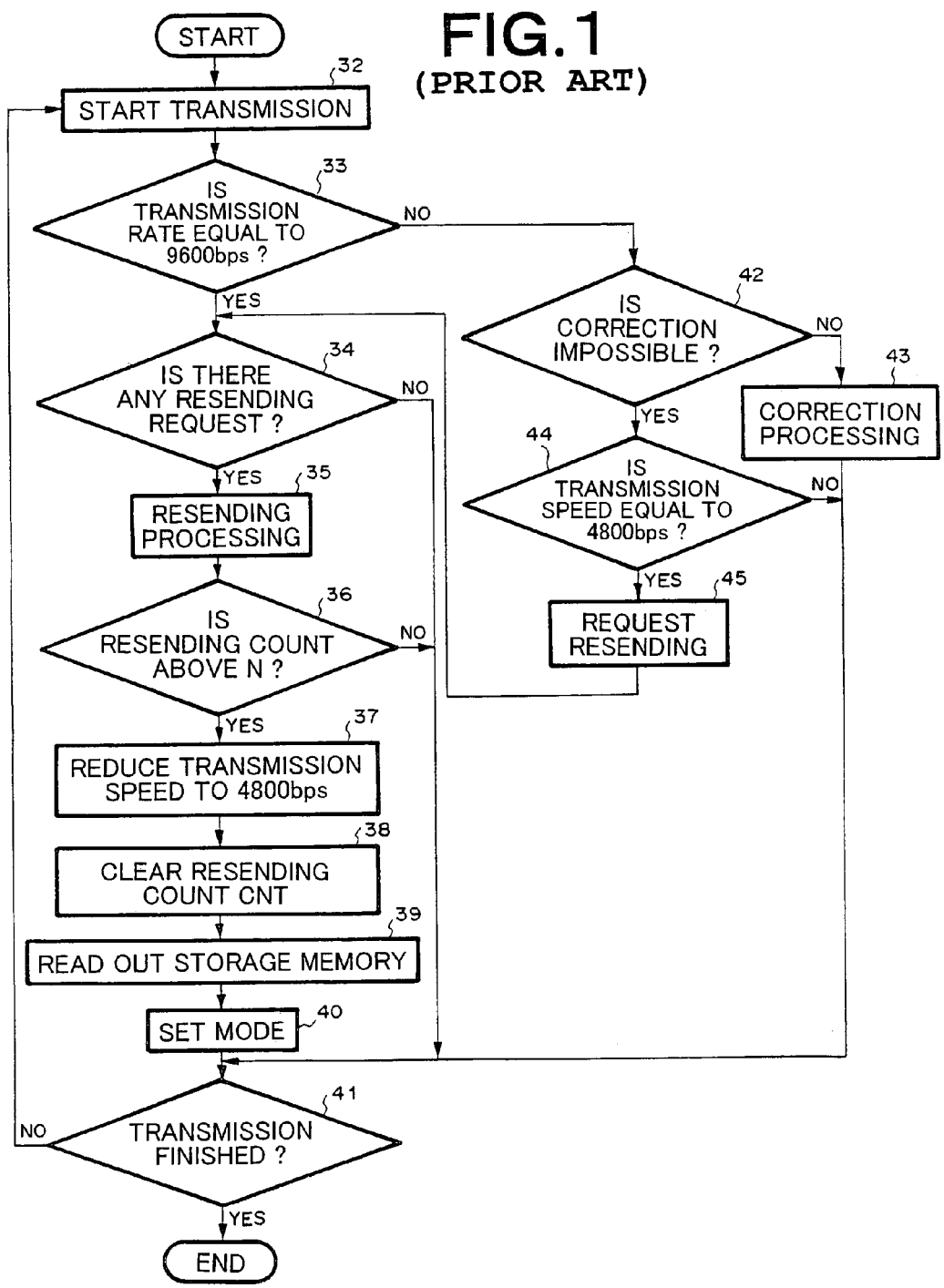
FIG. 1 is a control flowchart of a conventional resending request control system.
Figure 2:
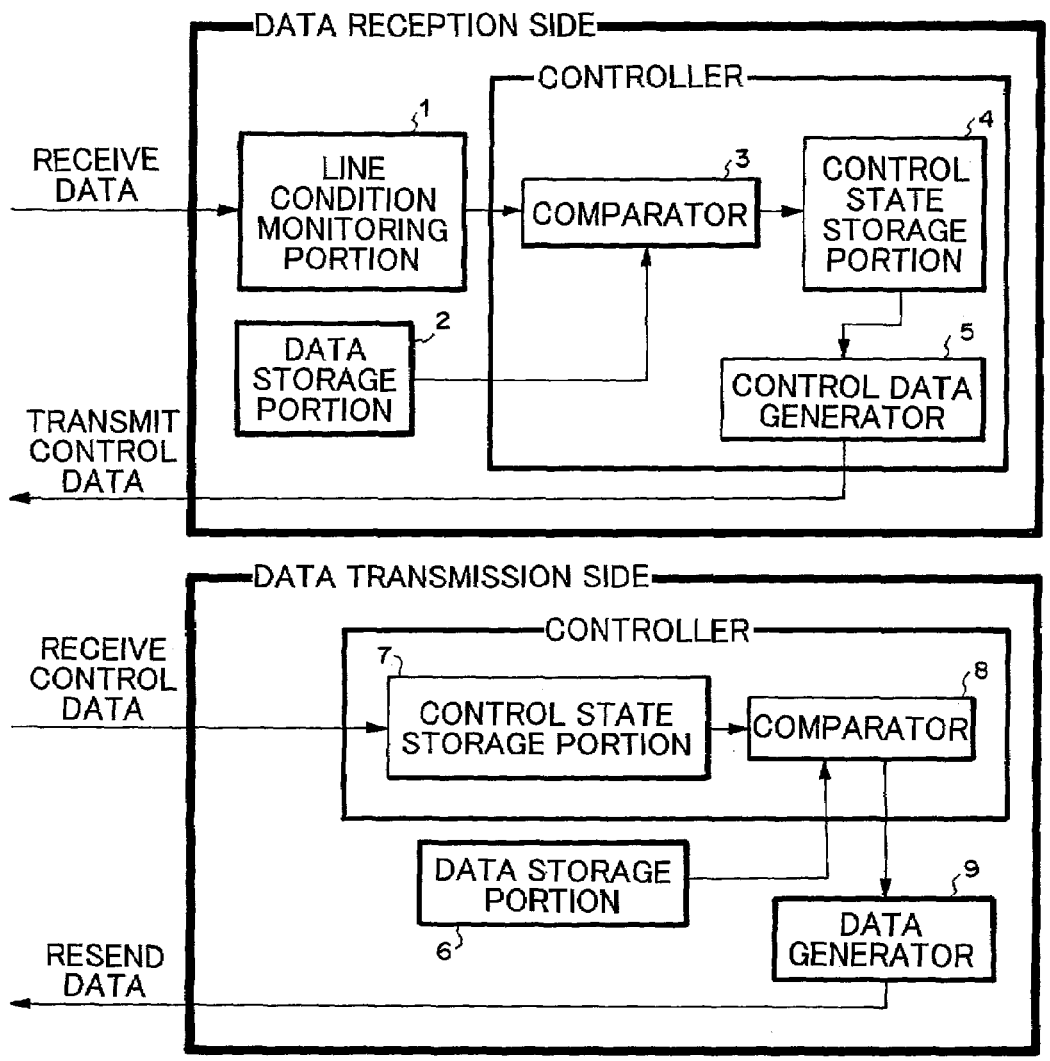
FIG. 2 is a system construction of an adaptive resending request control system based on a coding rate variable system.

FIG. 2 shows a system construction when coding rate variable resending request control for making variable the coding rate of data in accordance with the line state (the line condition) is performed.

At a data reception side, reception data are input to line state monitoring portion (line condition monitoring portion) 1 to measure the line state. The measurement result is input to comparator 3 and compared with data readout from data storage portion 2 to select the optimum control state from the data of the control states stored in the data storage portion 2 and renew the control state. Subsequently, control data are generated on the basis of the control state renewed in control data generator 5, and then transmitted to a data transmission side.

At the data transmission side, the control data received are stored in control state storage portion 7. The control data thus stored are compared with data read out from a data storage portion 6 at comparator 8 to renew the coding rate. Subsequently, data are generated in accordance with the coding rate thus renewed and then resent.

In the line state monitoring portion 1 at the data reception side a, the line state is measured by using one or both of SIR measurement and packet arrival rate measurement, or other methods. Here, the packet arrival rate means the ratio of the number of error-correctable packets arriving at the data reception side to the number of packets transmitted for a fixed time from the data transmission side. The association table of the line state measurement values, the coding rates and the control states are stored in the data storage portion 2. The association table of the coding rates and the control states is stored in the data storage portion 6. The ARQ system at this case is assumed to be Stop-and-wait or Go-back-N Continuous ARQ, or Selective-repeat continuous ARQ.

Figure 3:
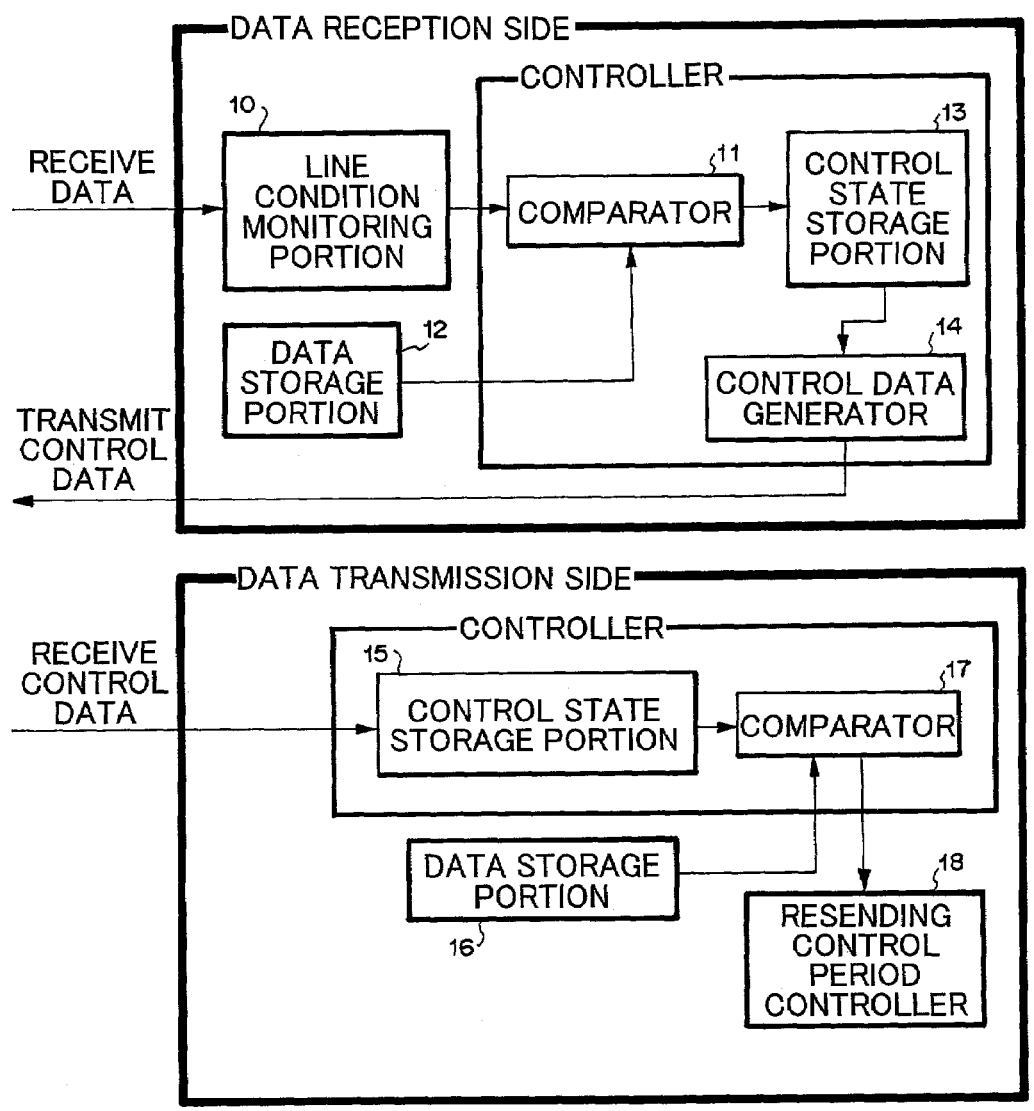
FIG. 3 is a system construction of an adaptive resending request control system based on a period variable system.

FIG. 3 shows the system construction of a period-variable resending request control system for making the resending period of data variable in accordance with the line state.

At the data reception side of this system construction, reception data are input to line state monitoring portion (line condition monitoring portion) 10 to measure the line state. The measurement result is input to comparator 11 and compared with data read out from data storage portion 12 to select the optimum control state from the data of the control states stored in the data storage portion 12 and renew the control state. Subsequently, control data are generated on the basis of the renewed control state in control data generator 14, and then transmitted to the data transmission side.

At the data transmission side, the control data are received, and stored in control state storage portion 15. The control state thus stored are input to comparator 17 and compared with data read out from data storage portion 16 to renew the resending control period. The data thus renewed are transmitted to resending control period controller 18 to control the resending control period.

The association table of the line state measurement values, the resending control periods and the control states is stored in the data storage portion 12 at the data reception side. The association table between the resending control period and the control state is stored in the storage portion 16. The ARQ system at this time is assumed to be Go-back-N Continuous ARQ, or Selective-repeat Continuous ARQ.

Figure 4:
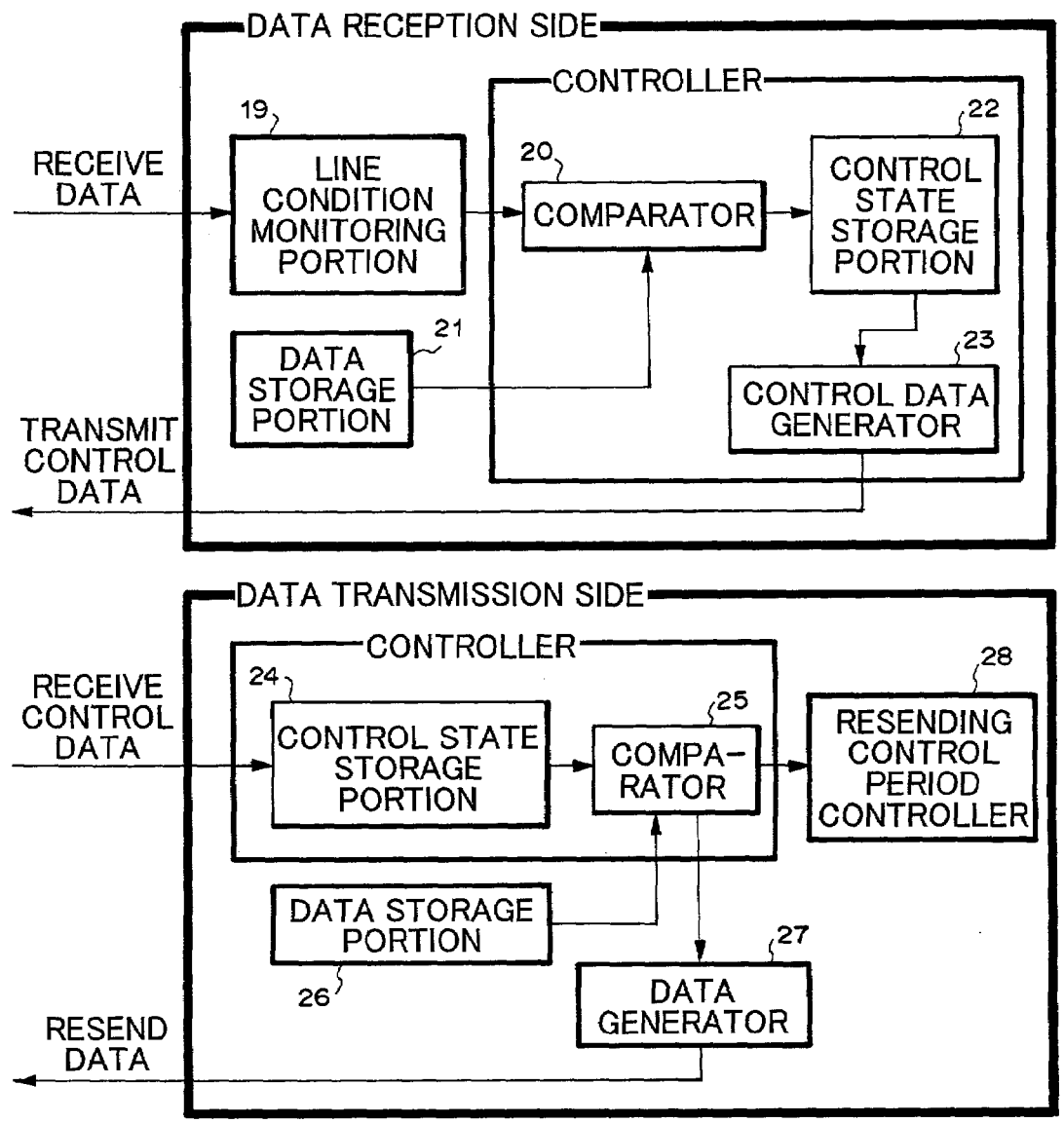
FIG. 4 is a system construction of an adaptive resending request control system based on a coding rate variable and period variable system.

FIG. 4 shows the system construction of an adaptive resending request control system for making both of the data coding rate and the resending control period variable in correspondence with the line state. In this system construction, at the reception side, reception data are input to line state monitoring portion (line condition monitoring portion) 19 to measure the line state. The measurement result is input to comparator 20 and compared with data read out from data storage portion 21 to select the optimum control state from the data of the control states stored in the data storage portion 21 and renew the control state. Subsequently, control data are generated in control data generator 23 on the basis of the renewed control state, and then transmitted to the data transmission side.

At the data transmission side, the control data are received and stored in control state storage portion 24. The control data thus stored are input to comparator 25 and compared with data read out from data storage portion 26 to renew the resending control period. The renewed data are transmitted to resending control period controller 28 and control the resending control period. Further, the coding rate is renewed and the renewed data are transmitted to data generator 27, and data are generated on the basis of the coding rate thus renewed and resent.

The association table of the line state measurement values, the data coding rates, the resending control periods and the control states are stored in the data storage portion 21 of the data reception side. The association table of the data coding rates, the resending control periods and the control states is stored in the storage portion 26. The ARQ system at this case is assumed to be Go-back-N Continuous ARQ or the Selective-repeat Continuous ARQ.

As described above, according to the present invention, the resending control period of data is made variable in accordance with the line state of the radio section, or both the data coding rate and the data resending control period are made variable in accordance with the line state of the radio section.

Further, according to the present invention, the control is performed so that any one of the SIR measurement result or the packet arrival rate can be selected from the reception data in accordance with the line state, so that any one or both of the throughput characteristic and the delay characteristic optimal to the line state can be enhanced.

According to the system construction of FIG. 2, the data reception side includes the line state monitoring portion 1 for receiving reception data and outputting an SIR measurement result from the reception data, the data storage portion 2 for storing the data to be compared with the measurement result, the comparator 3 for receiving the data read out from the data storage portion 2 and the SIR measurement result to compare both the data and the result and outputting a control state, the control state storage portion 4 for storing the control state, and the control data generator 5 for receiving the control state and outputting the control data. The data transmission side includes the control state storage portion 7 for storing the control state, the data storage portion 6 for storing data to be compared with the control data stored in the control state storage portion 7, the comparator 8 for receiving the control data and the data read out from the data storage portion 6 to compare both the data and outputting the data of the coding rate, and the data generator 9 for receiving the data of the coding rate and outputting the data.

Figure 5:
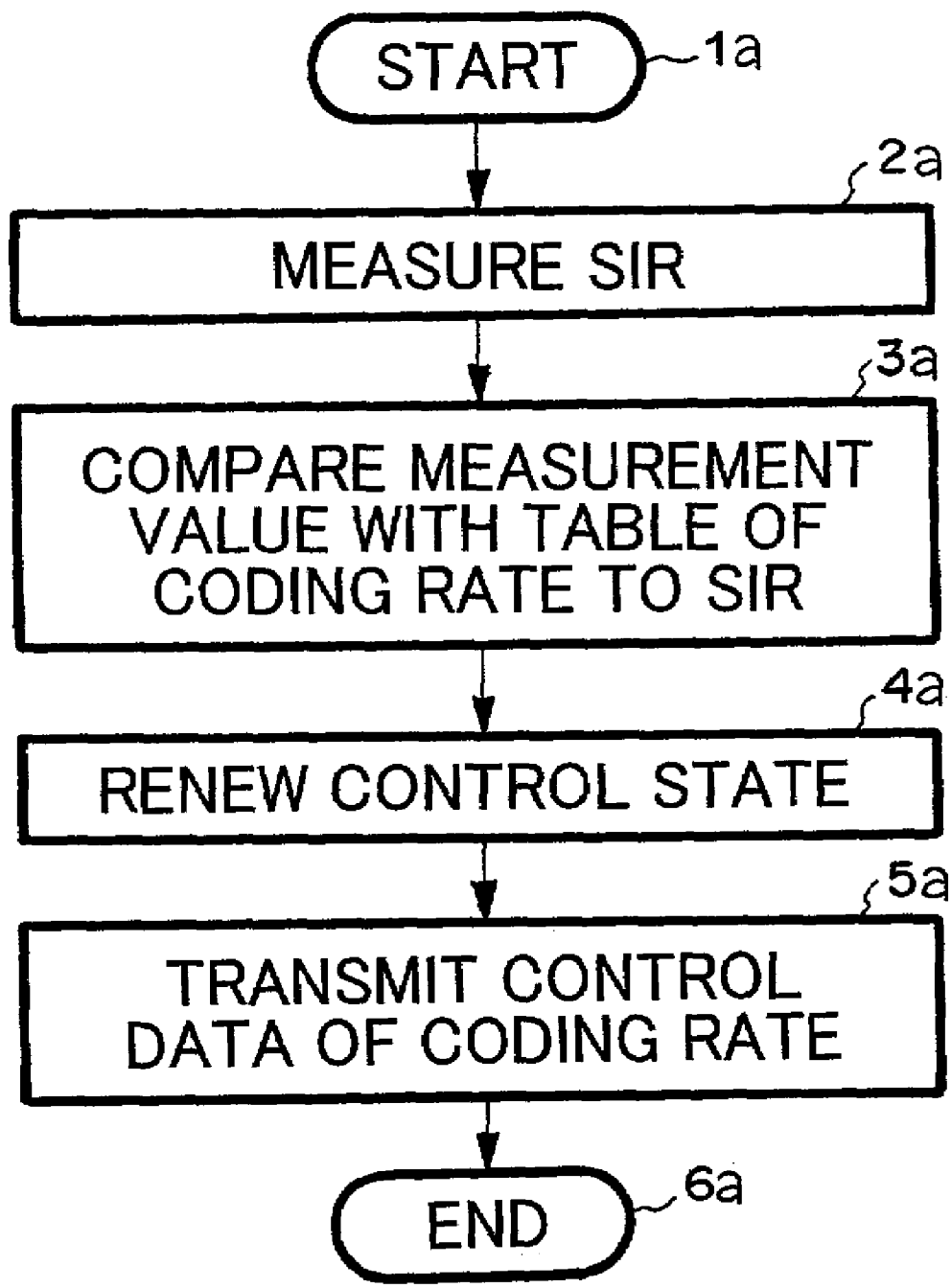
FIG. 5 is a control flowchart of the adaptive resending request control system based on the coding rate variable system at a data reception side.
Figure 6:
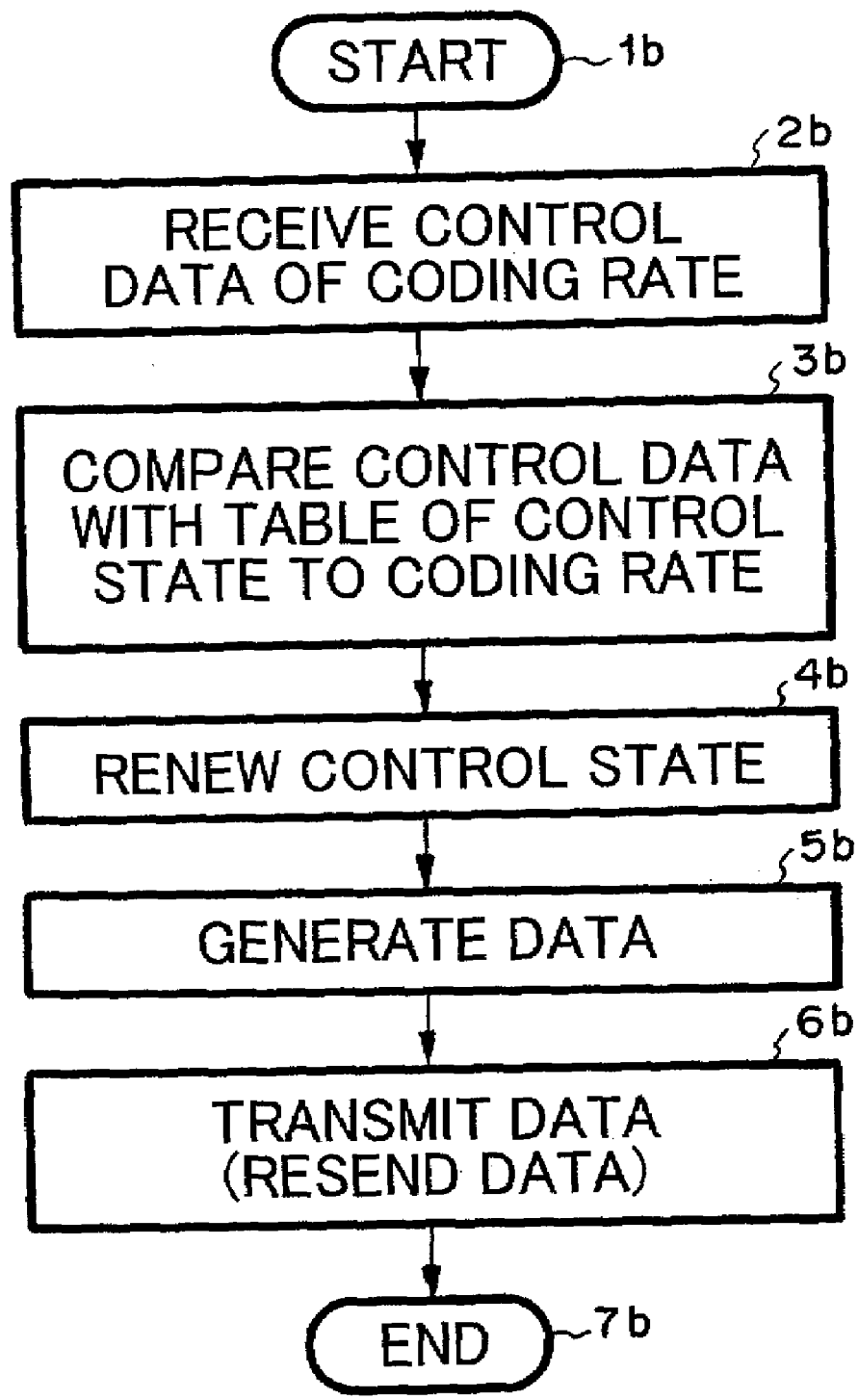
FIG. 6 is a control flowchart of the adaptive resending request control system based on the coding rate variable system at a data transmission side.

FIGS. 5 and 6 are control flowcharts at the data reception and transmission sides for the coding rate variable resending request control system when the line state monitoring portion carries out SIR measurement. In FIG. 5, SIR is measured in control step 2a, and the measurement value and the association table are compared with each other by using the association table stored in the data storage portion 2 in control step 3a.

In this embodiment, the association table of FIG. 7 is assumed to be used. The error correction coding is set to a 8-value soft decision Viterbi decoding. For example, if the measurement value of SIR is equal to 10 dB, control state S11 under which the coding rate is equal to ⅞ is selected on the basis of the association table. The control data under the control state S11 are transmitted to the data transmission side. Subsequently, if SIR is measured and the measurement value thereof is equal to 12 dB, control state S11 is selected from the association table to renew a control state to the control state S11. If the measurement value is equal to 7.5 dB, control state S12 is selected from the association table to renew a control state to the control state S12. If the measurement value is equal to 5 dB, control state S13 is selected to renew a control state to the control state S13. The control state is renewed in control step 4a of FIG. 5, and control data are transmitted in control step 5a.

Figure 9:
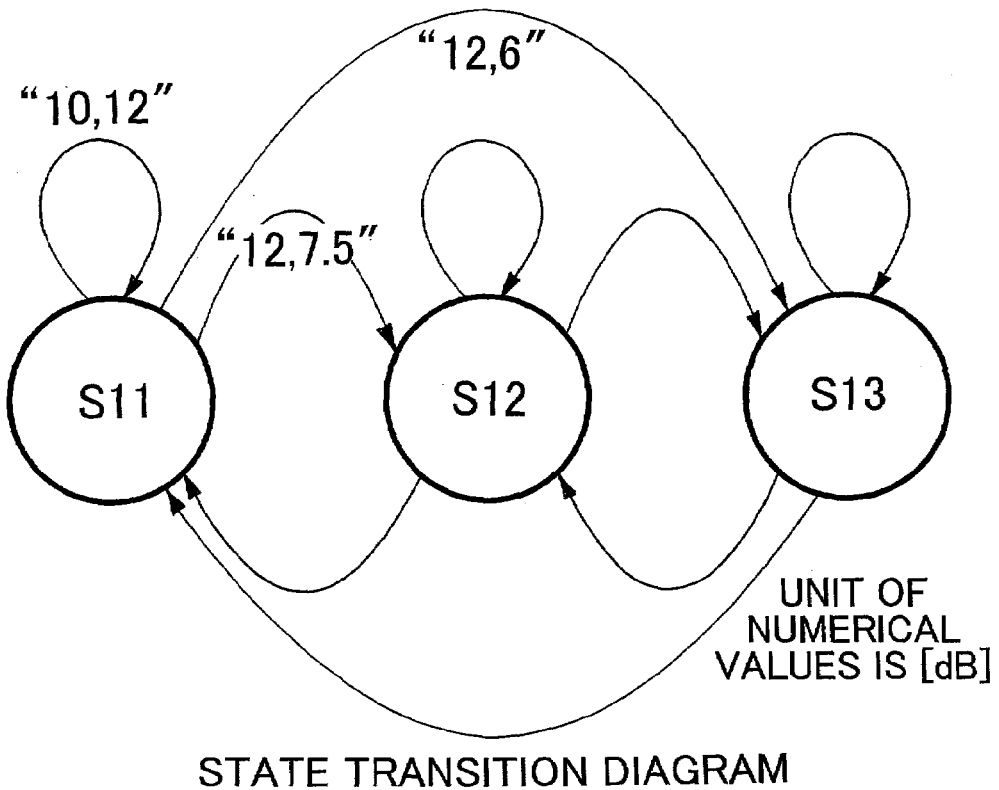
FIG. 9 is a state transition diagram when the control state of the adaptive resending request control system based on the coding rate variable system is renewed.

When the control data are received in control step 2b of FIG. 6 at the data transmission side, the control data and the association table of FIG. 8 stored in the data storage portion 6 are compared with each other in control step 3b. The control state is renewed in control step 4b, and data are generated on the basis of the coding rate of the renewed control state in control step 5b. The data are transmitted in control step 6b. FIG. 9 is a state transition diagram to renew the control state of the coding rate variable resending request control system.

The basis construction is as described above, however, in this embodiment the line state monitoring portion may be further improved. The improved construction of the line state monitoring portion is shown in FIG. 10.

Figure 10:
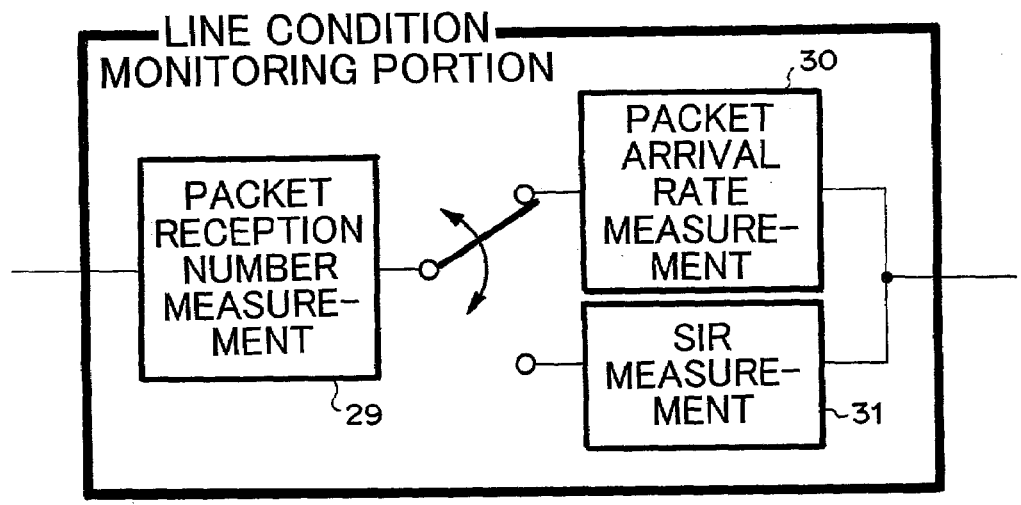
FIG. 10 is a block diagram showing the construction of a line state monitoring portion of FIG. 4.

In FIG. 10, after the measurement of the number of packet reception, the line state can be more surely grasped by performing such a switching control operation that the packet arrival rate is measured if the packet reception number is equal to a threshold value k or more and the SIR measurement is carried out if the packet reception number is less than the threshold value k.

Next, the construction and operation of the above embodiment will be described.

Referring to FIG. 3, the data reception side includes the line state monitoring portion 10 for receiving the reception data and outputting one of the SIR measurement result and the packet arrival rate from the reception data, the data storage portion 12 for storing the data to be compared with the measurement result, the comparator 11 for receiving the data read out from the data storage portion 12 and the measurement result to compare both the data and the result and outputting the control state, the control state storage portion 13 for storing the control state and the control data generator 14 for receiving the output of the control state storage portion 13 and outputting the control data.

The data transmission side of FIG. 3 includes the control state storage portion 15 for storing the control state, the data storage portion 16 for storing the data to be compared with the control data, the comparator 17 for receiving the control data and the data read out from the data storage portion 16 to compare both the data and outputting the data of the resending control period, and the resending control period controller 18 for controlling the window size of the resending control.

Figure 11:
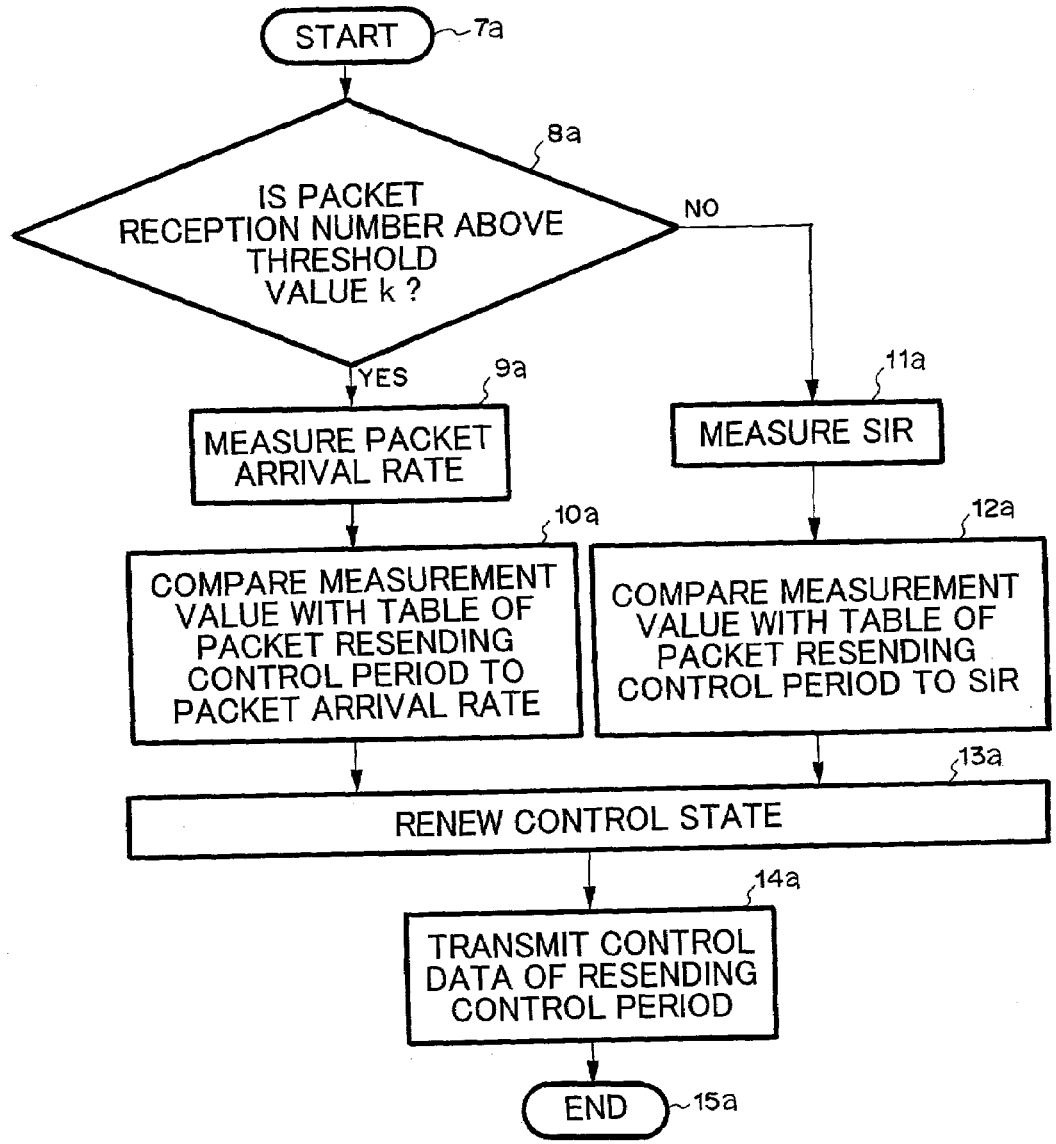
FIG. 11 is a control flowchart of the adaptive resending request control system based on the coding rate variable and period variable system at the data reception side.
Figure 12:
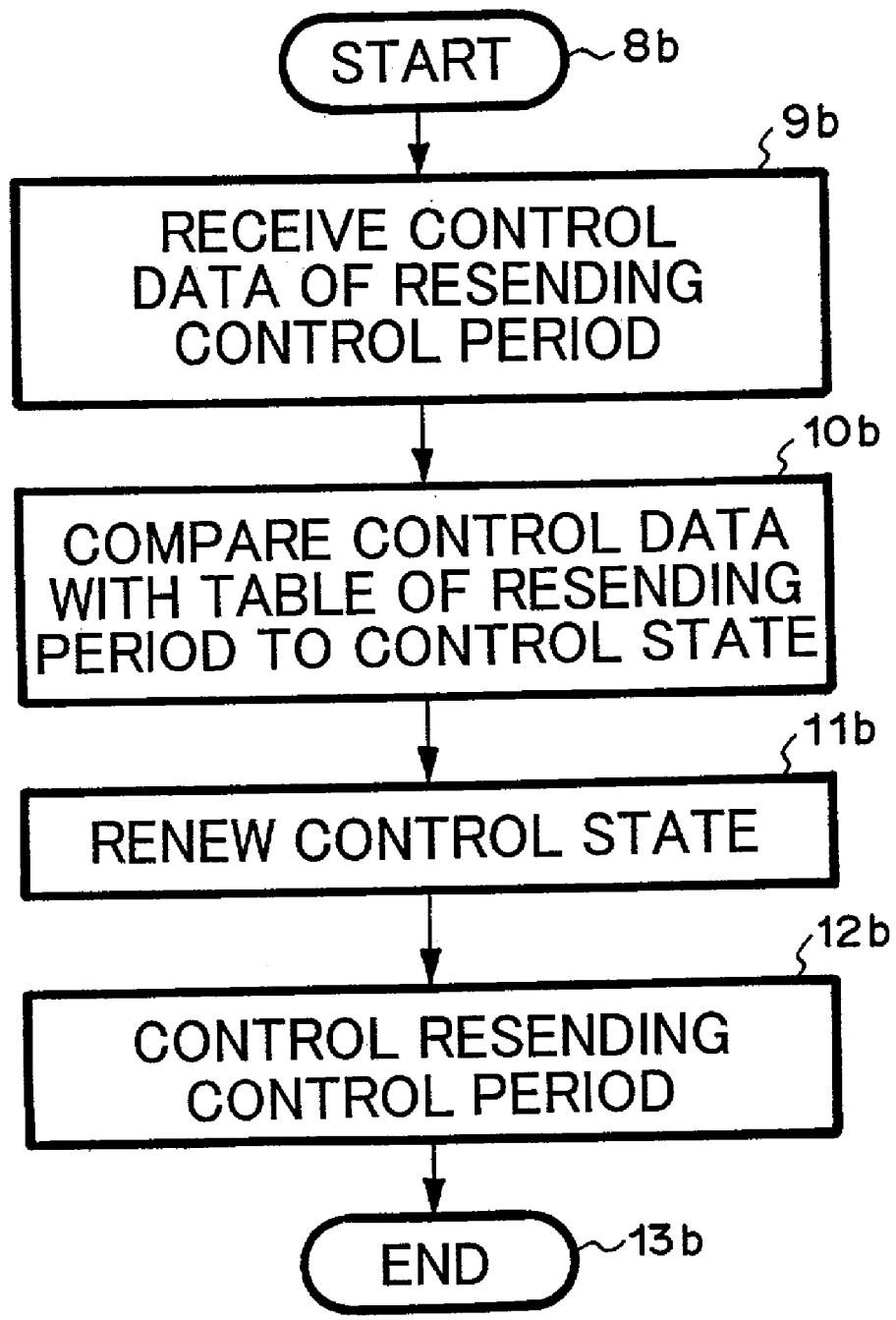
FIG. 12 is a control flowchart of the adaptive resending request control system based on the coding rate variable and period variable system at the data transmission side.

FIGS. 11 and 12 are control flow diagrams of the period variable resending request control system according to the embodiment of the present invention in which the line state monitoring portion shown in FIG. 3 performs the packet arrival rate measurement or the SIR measurement selectively. As shown FIG. 11, at the data reception side, when receiving the data, the number of packet reception for a fixed time is measured in control step 8*a*. If the packet reception number is equal to a threshold value k or more, the packet arrival rate is measured. On the other hand, if the packet reception number is less than k, the SIR is measured, whereby the line state can be surely grasped. In control step 10*a* and 12*a*, the measurement value and the association table (as shown in FIG. 13) stored in the data storage portion 12 are compared with each other.

For example, if the packet arrival rate is equal to 0.9, S21 is selected and the control data are transmitted. The measurement of the packet arrival rate is started again, and if the packet arrival rate is equal to 0.9 as shown in FIG. 13, S21 is selected to renew the control state to S21. If the packet arrival rate is equal to 0.7, S22 is selected to renew the control state to S22. If the packet arrival rate is equal to 0.4, S23 is selected to renew the control state to S23. In control step 14*a*, the control data are transmitted.

Figure 15:
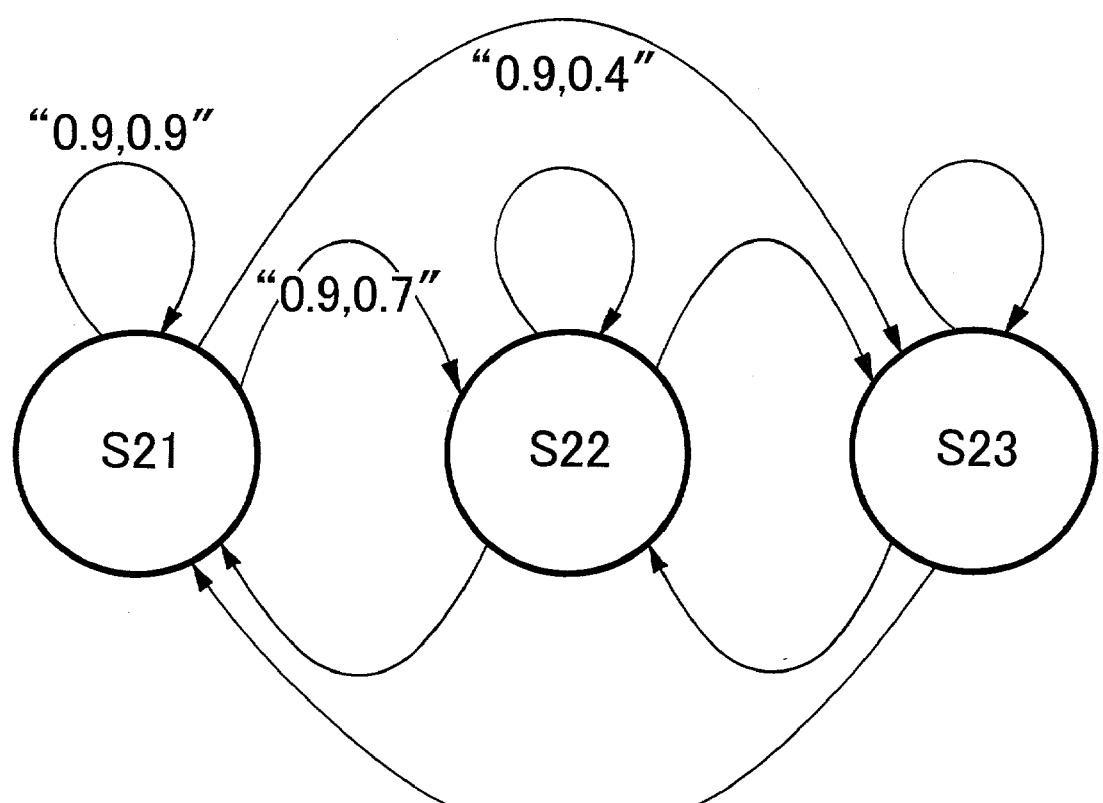
FIG. 15 is a state transition diagram when the control state of the adaptive resending request control system based on the period variable system is renewed.

At the reception side, the control data are received in control step 9*b* of FIG. 12, and the control data and the association table of FIG. 14 are compared with each other in control step 10*b*. In control step 11*b*, the control state is renewed, and the resending control period is controlled on the basis of the renewed data in control step 12*b*. FIG. 15 is a state transition diagram when the control state of the period variable resending control system of this embodiment is renewed.

FIG. 4 is a system diagram showing another embodiment in the adaptive resending request control system according to the present invention. Referring to FIG. 4, the data reception side includes the line state monitoring portion 19 for receiving the reception data and outputting one of the SIR measurement result and the packet arrival rate from the reception data, the data storage portion 21 for storing the data to be compared with the measurement result, the comparator 20 for receiving the data read out from the data storage portion 21 and the measurement result to compare both the data and the result and outputting the control state, the control state storage portion 22 for storing the control state, and the control data generator 29 for receiving the output of the control state storage portion 22 and outputting the control data.

Further, the data transmission side of FIG. 4 includes the control state storage portion 24 for storing the control state, the data storage portion 26 for storing the data to be compared with the control data, the comparator 25 for receiving the control data and the data read out from the data storage portion 26 to compare both the data and outputting the data of the resending control period, the data generator 27 for generating the data on the basis of the output of the comparator, and the resending control period controller 28 for controlling the window size of the resending control. In this embodiment, the data coding rate and the data resending control period are made variable in accordance with the line state as described above, and more effective adaptive resending request control can be implemented.

As described above, the present invention has the following effects. That is, a first effect resides in that the data coding rate and the data resending control period are made variable in correspondence with the line state of the radio section, so that the optimum throughput characteristic and the optimum delay characteristic can be provided in accordance with the line state. Further, a second effect resides in that the plural measuring methods are provided and the highest-precision measuring method can be selective from the plural measuring methods in accordance with the line state of the radio section, so that the high-precision line state can be grasped and the more effective adaptive resending request control can be performed.

What is claimed is:

1. A system for an adaptive resending request control in mobile radio communications, comprising:
   a reception side; and
   a transmission side, wherein,
   said reception side comprises
   measuring means for measuring a line state of a line of a radio section and providing line state measurement results,
   a first data storage portion storing data of control states of coding rates in correspondence with line state measurement values,
   a comparator receiving the measurement results and reading the data of the control states from the first data storage portion to select an optimum control state of a coding rate in correspondence with the measurement results on a basis of the read data of the control states stored in the first data storage portion, and
   means for renewing the control state and transmitting control data on the control state to said transmission side; and
   said transmission side comprises
   a second data storage portion storing data of control states of coding rates,
   second selecting means receiving the control data and reading the data of the control states from the second data storage portion for selecting the coding rate in correspondence with the received control data on the basis of the received control data and the read data of the control states stored in the second data storage portion, and
   means for generating data with the selected coding rate and transmitting the generated data to said reception side.

2. The system as claimed in claim 1, wherein said measuring means measures the number of packet reception and measures a line state by a line state-measuring method which is used suitable for the number of packet reception.

3. The system as claimed in claim 2, wherein said line state-measuring method is an SIR measuring method or a packet arrival rate measuring method.

4. The system of claim 1, wherein,
   the measuring means measures the line state by using one or both of SIR measurement and packet arrival rate measurement, the packet arrival rate defined as a ratio of a number of error-correctable packets arriving at the data reception side to a number of packets transmitted for a fixed time from the data transmission side, the control states stored in the first data storage portion comprises plural SIR ranges, each SIR range stored with a corresponding coding rate and a corresponding control state,
the control states stored in the second data storage portion comprises plural coding rates, each coding rate stored with a corresponding control state.

5. The system of claim 1, wherein,
the measuring means measures the line state by SIR measurement,
the control states stored in the first data storage portion comprises plural SIR ranges, each SIR range stored with a corresponding coding rate and a corresponding control state,
the control states stored in the second data storage portion comprises plural coding rates, each coding rate stored with a corresponding control state.

6. A system for an adaptive resending request control in mobile radio communications, comprising:
a reception side; and
a transmission side, wherein,
said reception side comprises
measuring means for measuring a line state of a line of a radio section and providing line state measurement results,
a first data storage portion storing data of control states of packet resending control periods in correspondence with line state measurement values,
a comparator receiving the measurement results and reading the data of the control states from the first data storage portion to select an optimum control state of a packet resending control period in correspondence with the measurement results on a basis of the read data of the control states stored in the first data storage portion, and
means for renewing the control state and transmitting control data on the control state to said transmission side; and
said transmission side comprises
a second data storage portion storing data of control states of packet resending control periods,
second selecting means receiving the control data and reading the data of the control states from the second data storage portion for selecting the packet resending control period in correspondence with the received control data on the basis of the received control data and the read data of the control states stored in the second data storage portion, and
control means for controlling a packet resending control period in response to the selected packet resending control period.

7. The system as claimed in claim 6, wherein said measuring means measures the number of packet reception and measures a line state by a line state-measuring method which is used suitable for the number of packet reception.

8. The system as claimed in claim 7, wherein said line state-measuring method is an SIR measuring method or a packet arrival rate measuring method.

9. The system of claim 6, wherein,
the measuring means measures the line state by using one or both of SIR measurement and packet arrival rate measurement, the packet arrival rate defined as a ratio of a number of error-correctable packets arriving at the data reception side to a number of packets transmitted for a fixed time from the data transmission side,
the control states stored in the first data storage portion comprises plural SIR ranges, each SIR range stored with a corresponding packet arrival rate, a packet resending control period, and a corresponding control state,
the control states stored in the second data storage portion comprises plural packet resending periods, each packet resending period stored with a corresponding control state.

10. The system of claim 6, wherein,
the measuring means measures the line state by SIR measurement,
the control states stored in the first data storage portion comprises plural SIR ranges, each SIR range stored with a corresponding packet arrival rate, a packet resending control period, and a corresponding control state,
the control states stored in the second data storage portion comprises plural packet resending periods, each packet resending period stored with a corresponding control state.

11. A system for an adaptive resending request control in mobile radio communications comprising:
a reception side; and
a transmission side, wherein,
said reception side comprises
measuring means for measuring a line state of a line of a radio section and providing line state measurement results,
a first data storage portion storing data of control states, the control states corresponding to coding rates and packet resending control periods in correspondence with line state measurement values,
a comparator receiving the measurement results and reading the data of the control states from the first data storage portion to select an optimum control state of a coding rate and packet resending control period in correspondence with the measurement results on a basis of the read data of the control states stored in the first data storage portion, and
means for renewing the control state and transmitting control data on the control state to said transmission side; and
said transmission side comprises
a second data storage portion storing data of control states, the control states corresponding to coding rates and packet resending control periods,
second selecting means receiving the control data and reading the data of the control states from the second data storage portion for selecting the coding rate and packet resending control period in correspondence with the received control data on the basis of the received control data and the read data of the control states stored in the second data storage portion,
means for generating data with the selected coding rate and transmitting the generated data to said reception side, and
control means for controlling a packet resending control period in response to the selected packet resending control period.

12. The system as claimed in claim 11, wherein said measuring means measures the number of packet reception and measures a line state by a line state-measuring method which is used suitable for the number of packet reception.

13. The system as claimed in claim 12, wherein said line state-measuring method is an SIR measuring method or a packet arrival rate measuring method.

14. The system of claim 11, wherein,
- the measuring means measures the line state by using one or both of SIR measurement and packet arrival rate measurement, the packet arrival rate defined as a ratio of a number of error-correctable packets arriving at the data reception side to a number of packets transmitted for a fixed time from the data transmission side,
- the control states stored in the first data storage portion comprises plural SIR ranges, each SIR range stored with a corresponding coding rate and a corresponding control state,
- the control states stored in the second data storage portion comprises plural coding rates, each coding rate stored with a corresponding control state.

15. The system of claim 14, wherein,
- the control states stored in the first data storage portion further comprises plural SIR ranges, each SIR range stored with a corresponding packet arrival rate, a packet resending control period, and a corresponding control state,
- the control states stored in the second data storage portion further comprises plural packet resending periods, each packet resending period stored with a corresponding control state.

* * * * *